United States Patent
Xu et al.

(10) Patent No.: US 11,973,569 B2
(45) Date of Patent: Apr. 30, 2024

(54) METHOD FOR REQUEST SCHEDULING IN UAV-ASSISTED MOBILE EDGE COMPUTING (MEC) NETWORK

(71) Applicant: Dalian University of Technology, Dalian (CN)

(72) Inventors: Zichuan Xu, Dalian (CN); Qiufen Xia, Dalian (CN); Haiyang Qiao, Dalian (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 17/510,879

(22) Filed: Oct. 26, 2021

(65) Prior Publication Data

US 2024/0080090 A1  Mar. 7, 2024

(30) Foreign Application Priority Data

Jun. 7, 2021 (CN) .......................... 202110629979.9

(51) Int. Cl.
  *H04B 7/185* (2006.01)
  *H04L 47/62* (2022.01)
  *H04W 28/02* (2009.01)

(52) U.S. Cl.
  CPC ..... *H04B 7/18504* (2013.01); *H04L 47/6225* (2013.01); *H04W 28/0231* (2013.01)

(58) Field of Classification Search
  CPC ........... H04B 7/18504; H04L 47/6225; H04W 28/0231
  See application file for complete search history.

(56) References Cited

U.S. PATENT DOCUMENTS 9,262,929 B1 * 2/2016 Roy ................... G08G 5/006
9,409,646 B2 * 8/2016 Fleck .................. G05D 1/0011
(Continued)

FOREIGN PATENT DOCUMENTS

CN  111970713 A * 11/2020 ......... H04B 7/18504
CN  112911648 A * 6/2021
(Continued)

OTHER PUBLICATIONS

L. Bartolomei, L. Teixeira and M. Chli, "Perception-aware Path Planning for UAVs using Semantic Segmentation," 2020 IEEE/RSJ International Conference on Intelligent Robots and Systems (IROS), Las Vegas, NV, USA, 2020, pp. 5808-5815, doi: 10.1109/IROS45743.2020.9341347. (Year: 2020).*

(Continued)

*Primary Examiner* — Yuwen Pan
*Assistant Examiner* — Swati Jain
(74) *Attorney, Agent, or Firm* — Shih IP Law Group, PLLC

(57) ABSTRACT

A method for request scheduling in an unmanned aerial vehicle-assisted mobile edge computing network: determining multiple feasible UAV deployment points based on obstruction information in a target area; randomly selecting U feasible UAV deployment points from the multiple feasible UAV deployment points as UAV deployment points; dividing each UAV into multiple virtual UAVs; allocating user requests in a central queue of a UAV-assisted MEC to the virtual UAVs; using a round-robin policy to schedule the user requests allocated to each virtual UAV; after a specified time period t, if a network pressure mitigation condition isn't met, inputting historical user request data of each feasible UAV deployment point into a trained MT-LSTM neural network model, obtaining a to-be-processed data volume of each feasible UAV deployment point in a next specified time (Continued)

period t; re-determining UAV deployment points; redeploying UAVs carrying small cell base stations based on the new UAV deployment points.

9 Claims, 2 Drawing Sheets

(56) References Cited

U.S. PATENT DOCUMENTS

| | | | |
|---|---|---|---|
| 9,930,537 B2* | 3/2018 | Ljung | H04W 16/26 |
| 11,597,614 B2* | 3/2023 | Priest | B65G 67/00 |
| 11,611,937 B1* | 3/2023 | Thantharate | H04W 52/0229 |
| 11,790,791 B2* | 10/2023 | Sarim | G08G 5/0021 |
| | | | 701/14 |
| 2019/0002122 A1* | 1/2019 | Ding | G08G 5/0034 |
| 2019/0197643 A1* | 6/2019 | Cochran | G06Q 10/06315 |
| 2019/0289613 A1* | 9/2019 | Fanelli | H04W 4/40 |
| 2019/0319868 A1* | 10/2019 | Svennebring | H04W 24/08 |
| 2020/0186964 A1* | 6/2020 | Lekutai | G08G 1/0125 |
| 2022/0376772 A1* | 11/2022 | Zhao | H04W 4/08 |
| 2023/0109390 A1* | 4/2023 | Wang | G05D 1/104 |
| | | | 701/120 |

FOREIGN PATENT DOCUMENTS

| | | | | |
|---|---|---|---|---|
| CN | 113225746 B | * | 6/2022 | G08G 5/0052 |
| KR | 2199680 B1 | * | 1/2021 | |

OTHER PUBLICATIONS

W. Zhang, L. Li, N. Zhang, T. Han and S. Wang, "Air-Ground Integrated Mobile Edge Networks: A Survey," in IEEE Access, vol. 8, pp. 125998-126018, 2020, doi: 10.1109/ACCESS.2020.3008168. (Year: 2020).*

Sanchez-Aguero, V.; Valera, F.; Vidal, I.; Tipantuña, C.; Hesselbach, X. Energy-Aware Management in Multi-UAV Deployments: Modelling and Strategies. Sensors 2020, 20, 2791. https://doi.org/10.3390/s20102791 (Year: 2020).*

Carney, E., Castano, L., & Xu, H. (2019). Determination of safe landing zones for an autonomous UAS using elevation and population density data. (Year: 2019).*

* cited by examiner

METHOD FOR REQUEST SCHEDULING IN UAV-ASSISTED MOBILE EDGE COMPUTING (MEC) NETWORK

CROSS REFERENCE TO RELATED APPLICATION

This patent application claims the benefit and priority of Chinese Patent Application No. 202110629979.9, filed on Jun. 7, 2021, which is hereby incorporated by reference in its entirety.

TECHNICAL FIELD

The present disclosure relates to the technical field of mobile edge computing, and in particular, to a method for request scheduling in an unmanned aerial vehicle (UAV)-assisted mobile edge computing (MEC) network.

BACKGROUND

With larger network capacity, faster transmission speed, stronger real-time capability, and full-space connection, 5G can bring ultimate experience to users (humans and machines). It will usher the era of Internet of Things (IoT) and accelerate the digitalization process. By 2025, the number of IoT devices in the world is expected to exceed 75 billion, and the amount of data generated by the IoT is expected to reach 79.4 ZB, according to a report from Statista.

5G small cell base stations can be deployed adjacent to IoT devices to better release potential of IoT. These small cell base stations usually have a computing capability, and can cache some IoT services from the remote cloud on them. The IoT devices can offload tasks to nearby small cell base stations for processing. In this way, the processing of IoT data can be accelerated, and the end-to-end service delay can be greatly reduced. This new type of computing is called mobile edge computing (MEC) and has been taken as a key driving force for 5G networks.

At present, despite the above-mentioned advantages, 5G communication still has disadvantages such as severe signal attenuation, small coverage, and susceptibility to obstacle interference, due to its short wavelength.

BRIEF SUMMARY

The present disclosure aims, in some respect, to provide a method for request scheduling in an unmanned aerial vehicle (UAV)-assisted mobile edge computing (MEC) network, to reduce service delay, improve quality of service, and optimize network coverage.

To implement the above objectives, the present disclosure provides the following solutions:

A method for request scheduling in a UAV-assisted MEC network, including:
  when receiving a UAV assistance request from a target area, dividing the target area into multiple blocks of equal size, and determining multiple feasible UAV deployment points based on obstruction information in the target area, where one feasible UAV deployment point corresponds to one block;
  randomly selecting U feasible UAV deployment points from the multiple feasible UAV deployment points as UAV deployment points;
  dispatching U UAVs carrying small cell base stations to the U UAV deployment points respectively, and one UAV deployment point can only hover one UAV at any time;
  dividing each UAV into multiple virtual UAVs, where each virtual UAV has the same position as the corresponding physical UAV, and total computing resources of all the virtual UAVs are equal to computing resources of the corresponding physical UAV;
  allocating user requests in a central queue of a UAV-assisted MEC system to the virtual UAVs, where the central queue of the system is jointly maintained by an edge server and all the UAVs carrying small cell base stations;
  using a round-robin (RR) policy to schedule the user requests allocated to each virtual UAV;
  after a specified time period t, determining whether network pressure of the target area meets a mitigation condition;
  if the mitigation condition is met, controlling all the UAVs carrying small cell base stations to fly away from the target area;
  if the mitigation condition is not met, obtaining historical user request data of each feasible UAV deployment point;
  inputting the historical user request data of each feasible UAV deployment point into a trained multi-timescale long short-term memory (MT-LSTM) neural network model to predict a to-be-processed data volume of each feasible UAV deployment point in a next specified time period t; and
  re-determining UAV deployment points based on the predicted to-be-processed data volume of each feasible UAV deployment point in the next specified time period t, redeploying UAVs carrying small cell base stations based on the UAV deployment points, and returning to the step of "dividing each UAV into multiple virtual UAVs, where each virtual UAV has the same position as the corresponding physical UAV, and total computing resources of all the virtual UAVs are equal to computing resources of the corresponding physical UAV".

Optionally, before the dividing, when receiving a UAV assistance request from a target area, the target area into multiple blocks of equal size, and determining multiple feasible UAV deployment points based on obstruction information in the target area, the method specifically includes:
  collecting network load and network delay information of the target area;
  determining whether the network load is greater than a first preset load value or whether the network delay is greater than a first preset delay value; and
  if the network load is greater than the first preset load value or the network delay is greater than the first preset delay value, sending the UAV assistance request.

Optionally, when receiving the UAV assistance request from the target area, the method further includes:
  obtaining the obstruction information in the target area through a reconnaissance UAV.

Optionally, the mitigation condition is that the network load is less than a second preset load value and the network delay is less than a second preset delay value.

Optionally, the re-determining UAV deployment points based on the predicted to-be-processed data volume of each feasible UAV deployment point in the next specified time period t, and redeploying UAVs carrying small cell base stations based on the UAV deployment points specifically includes:

sorting the predicted to-be-processed data volumes of the feasible UAV deployment points in the next specified time period t in descending order, and selecting the first U feasible deployment points as new UAV deployment points; and deploying the U UAVs carrying small cell base stations to the UAV deployment points, where one UAV deployment point can only hover one UAV at any time.

Optionally, when obtaining historical user request data of each feasible UAV deployment point, the method further includes:

updating an average flow time of user requests at each feasible UAV deployment point based on historical user requests processed at each feasible UAV deployment point, where a flow time is a time difference between a time point at which processing of a user request is completed and a time point at which the request arrives at the central queue of the system; and based on the average flow time of the user requests at each feasible UAV deployment point, determining a maximum number of groups for prediction in the MT-LSTM neural network model corresponding to each feasible UAV deployment point; and classifying gates, storage units, and hidden states in the MT-LSTM neural network model into g groups, where each group is activated on a different time scale, and the maximum number of groups is a maximum number of groups activated in the MT-LSTM neural network model.

Optionally, the maximum number of groups is denoted as $g_q = \max\{\lfloor \log_2 F_q \rfloor, 2\}$, where $g_q$ represents a maximum number of groups of each feasible UAV deployment point, and $F_q$ represents an average flow time of each feasible UAV deployment point.

Optionally, the using an RR policy to schedule the user requests allocated to each virtual UAV specifically includes:

dividing the specified time period t into multiple time slots; and in each time slot, using the RR policy to schedule the user requests allocated to each virtual UAV.

Optionally, if the mitigation condition is not met, the method further includes:

determining whether a battery level of each UAV is less than a preset battery level threshold; and If yes, controlling a UAV with a battery level less than the preset battery level threshold to return to a charging point for charging, and after the charging is completed, controlling the UAVs to return to the target area.

Based on specific embodiments provided in the present disclosure, the present disclosure discloses the following technical effects:

Through targeted UAV deployment, the present disclosure divides each UAV into multiple virtual UAVs and uses the RR policy to schedule user requests received by UAVs, to optimize network coverage and better meet user needs. In addition, assistance based on UAVs carrying small cell base stations features cost-effectiveness, rapid deployment, and strong scalability, which can well respond to sudden network needs and relieve network pressure.

BRIEF DESCRIPTION OF THE SEVERAL VIEWS OF THE DRAWINGS

Illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another.

Moreover, it will be appreciated that such a development effort might be complex and time-consuming but would nevertheless be a routine undertaking for those of ordinary skill in the art having the benefit of this disclosure. The method for request scheduling in an unmanned aerial vehicle-assisted mobile edge computing network disclosed herein boasts a variety of inventive features and components that warrant patent protection, both individually and in combination.

DETAILED DESCRIPTION

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure includes a method for request scheduling in a UAV-assisted MEC network, to reduce service delay, improve quality of service, and optimize network coverage.

To make the above-mentioned objectives, features, and advantages of the present disclosure clearer and more comprehensible, the present disclosure will be further described in detail below with reference to the accompanying drawings and the specific implementation.

Figure 1:
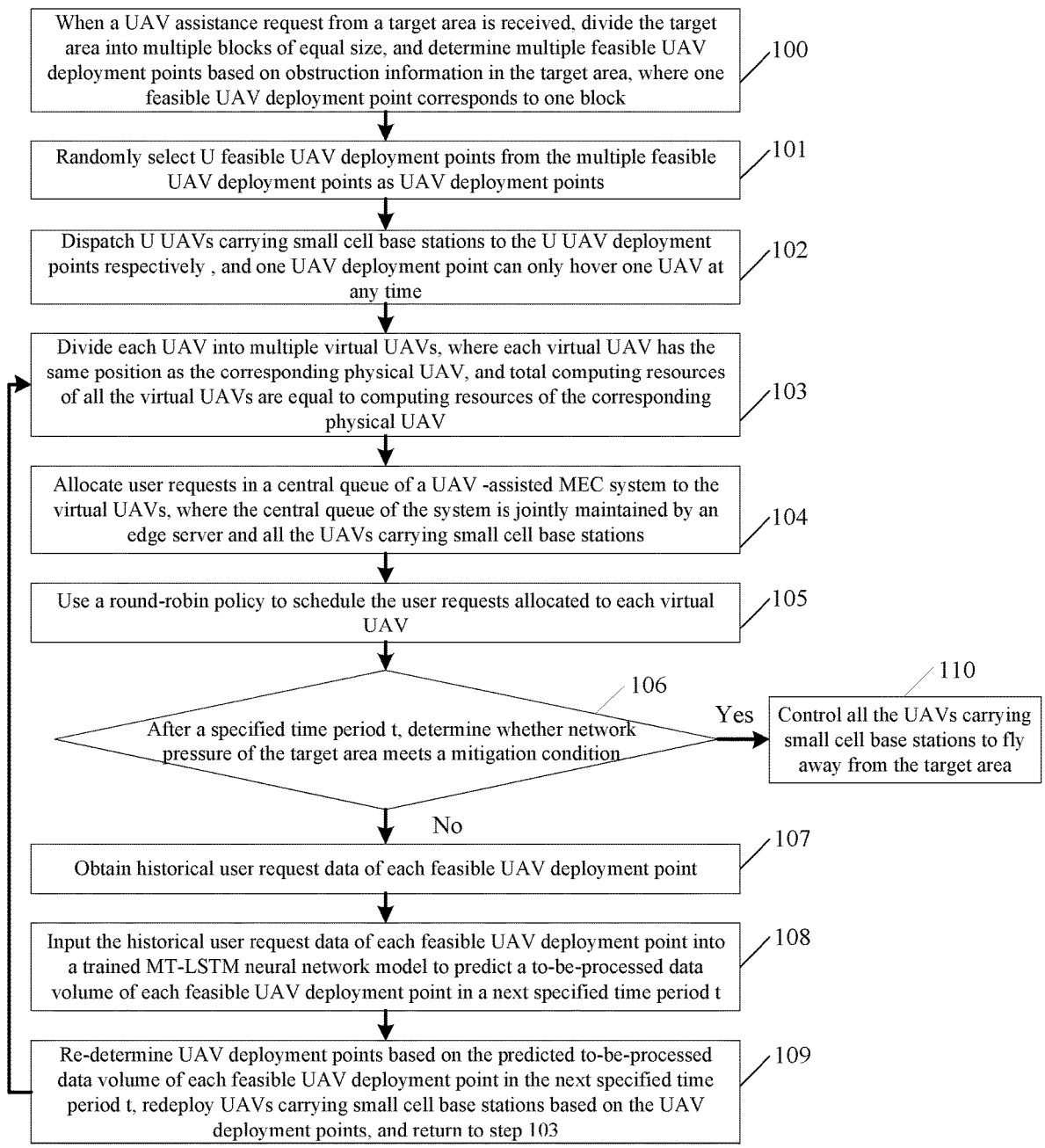
FIG. 1 is a schematic flowchart of a method for request scheduling in a UAV-assisted MEC network according to the present disclosure.

FIG. 1 is a schematic flowchart of a method for request scheduling in a UAV-assisted MEC network according to the present disclosure. As shown in FIG. 1, the method for request scheduling in a UAV-assisted MEC network includes the following steps.

Step 100: When a UAV assistance request from a target area is received, divide the target area into multiple blocks of equal size, and determine multiple feasible UAV deployment points based on obstruction information in the target area, where one feasible UAV deployment point corresponds to one block. The blocks are square blocks.

Step 101: Randomly select U feasible UAV deployment points from multiple feasible UAV deployment points as UAV deployment points.

Step 102: Dispatch U UAVs carrying small cell base stations to the U UAV deployment points respectively, and one UAV deployment point can only hover one UAV at any time.

Step 103: Divide each UAV into multiple virtual UAVs, where each virtual UAV has the same position as the corresponding physical UAV, and total computing resources of all the virtual UAVs are equal to computing resources of the corresponding physical UAV.

Step 104: Allocate user requests in a central queue of a UAV-assisted MEC system to the virtual UAVs, where the central queue of the system is jointly maintained by an edge server and all the UAVs carrying small cell base stations.

Step 105: Use a round-robin scheduling policy to schedule the user requests allocated to the virtual UAVs.

Step 106: After a specified time period t, determine whether network pressure of the target area meets a mitigation condition.

If the mitigation condition is met, perform step 110.

Step 110: Control all the UAVs carrying small cell base stations to fly away from the target area.

If the mitigation condition is not met, perform step 107.

Step 107: Obtain historical user request data of each feasible UAV deployment point.

If the mitigation condition is not met, the method further includes:
  determining whether a battery level of each UAV is less than a preset battery level threshold; and
  if yes, controlling a UAV with a battery level less than the preset battery level threshold to return to a charging point for charging, and after the charging is completed, controlling the UAV to return to the target area.

Step 108: Input the historical user request data of each feasible UAV deployment point into a trained MT-LSTM neural network model to predict a to-be-processed data volume of each feasible UAV deployment point in a next specified time period t.

Step 109: Re-determine UAV deployment points based on the predicted to-be-processed data volume of each feasible UAV deployment point in the next specified time period t, redeploy UAVs carrying small cell base stations based on the UAV deployment points, and return to step 103.

Before step 101, the method specifically includes:
  collecting network load and network delay information of the target area;
  determining whether the network load is greater than a first preset load value or whether the network delay is greater than a first preset delay value; and
  if the network load is greater than the first preset load value or the network delay is greater than the first preset delay value, sending the UAV assistance request.

When receiving the UAV assistance request from the target area in step 101, the method further includes:
  obtaining the obstruction information in the target area through a reconnaissance UAV.

The mitigation condition is that the network load is less than a second preset load value and the network delay is less than a second preset delay value.

Step 109 specifically includes:
  sorting the predicted to-be-processed data volumes of the feasible UAV deployment points in the next specified time period t in descending order, and selecting the first U feasible deployment points as new UAV deployment points; and
  deploying the U UAVs carrying small cell base stations to the UAV deployment points, and one UAV deployment point can only hover one UAV at any time.

When obtaining historical user request data of each feasible UAV deployment point in step 107, the method further includes:
  updating an average flow time of user requests at each feasible UAV deployment point based on historical user requests processed at each feasible UAV deployment point, where a flow time is a time difference between a time point at which processing of a user request is completed and a time point at which the request arrives at the central queue of the system; and
  based on the average flow time of the user requests at each feasible UAV deployment point, determining a maximum number of groups for prediction in the MT-LSTM neural model corresponding to each feasible UAV deployment point; and classifying gates, storage units, and hidden states in the MT-LSTM neural network model into g groups, where each group is activated on a different time scale; the maximum number of groups is a maximum number of groups activated in the MT-LSTM neural network model; and each feasible UAV deployment point corresponds to one maximum number of groups during prediction.

The maximum number of groups is denoted as $$g_q = \max\{\lfloor \log_2 F_q \rfloor, 2\},$$

where
  $g_q$ represents a maximum number of groups of each feasible UAV deployment point q, and $F_q$ represents an average flow time of each feasible UAV deployment point q.

Step 105 specifically includes:
  dividing the specified time period t into multiple time slots; and
  in each time slot, using the RR policy to schedule the user requests allocated to each virtual UAV.

If the mitigation condition is not met, the method further includes:
  determining whether a battery level of each UAV is less than a preset battery level threshold; and
  if yes, controlling a UAV with a battery level less than the preset battery level threshold to return to a charging point for charging, and after the charging is completed, controlling the UAV to return to the target area.

Figure 2:
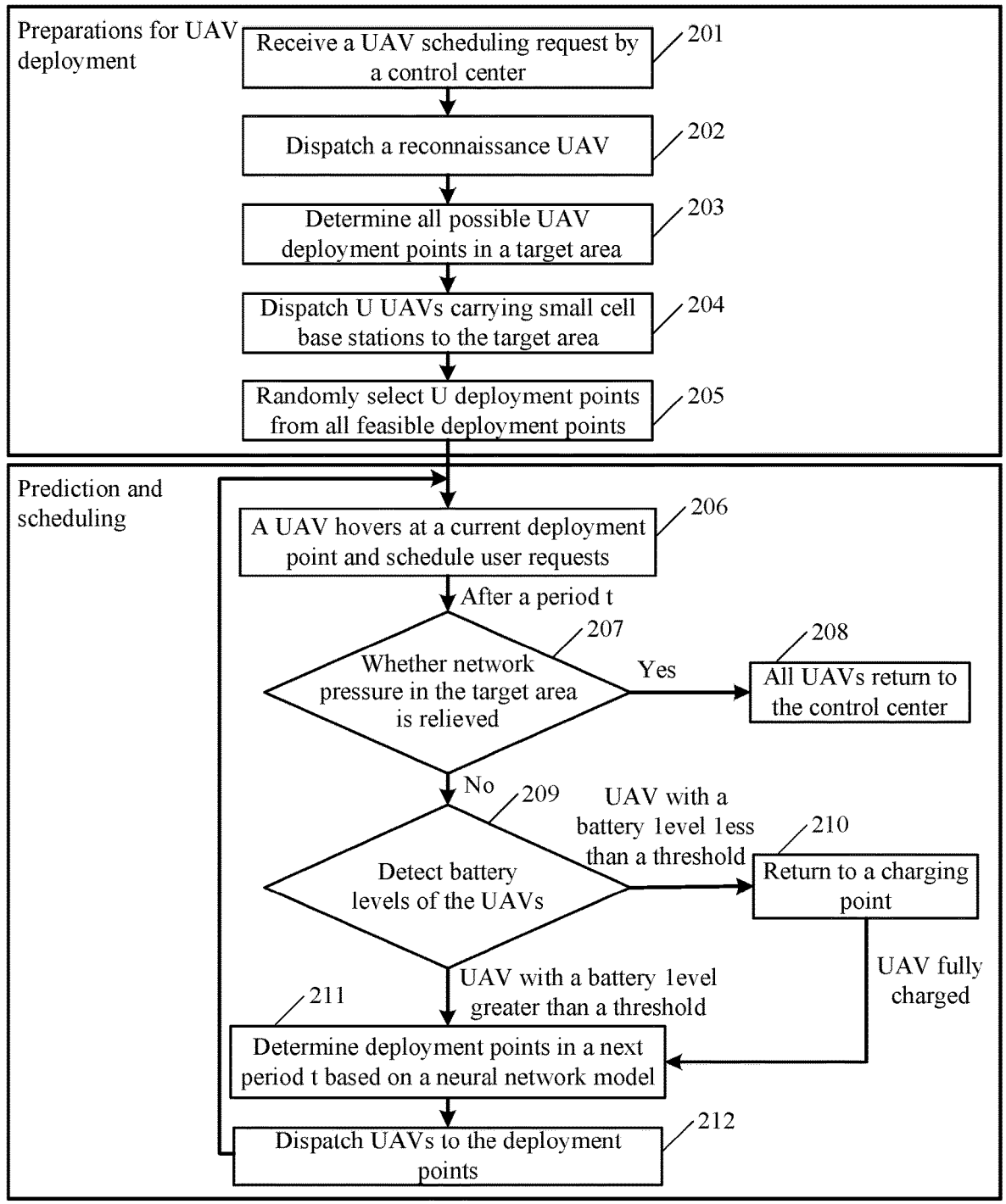
FIG. 2 is a specific schematic flowchart of a method for request scheduling in a UAV-assisted MEC network according to an embodiment of the present disclosure.

FIG. 2 is a specific schematic flowchart of a method for request scheduling in a UAV-assisted MEC network according to an embodiment the present disclosure. As shown in FIG. 2, the method for request scheduling in a UAV-assisted MEC network is described in detail by using a specific embodiment.

Step 201: Receive a UAV scheduling request by a control center. Specifically, when a target area has an excessively large network load or requires a network service of higher quality (lower network delay, or the like), it may choose to request a control center for UAVs carrying small cell base stations, and the control center dispatches UAVs to the target area for assistance after receives the assistance request.

Step 202: Dispatch a reconnaissance UAV. Specifically, the UAV dispatches a reconnaissance UAV to detect the target area and collect information about possible obstructions such as buildings and tall trees in the target area.

Step 203: Determine all possible UAV deployment points in a target area. Divide the target area into blocks of equal size. Then, based on the obstruction information obtained in Step 2, select blocks on which the UAV can hover from all the blocks, then from these blocks, select blocks to which UAVs can be dispatched (there may be some blocks that UAVs can hover on, but cannot be dispatched to due to obstructions or other reasons) as feasible deployment points, and mark all the feasible deployment points by using 1, 2, . . . , Q.

Step 204: Dispatch U UAVs carrying small cell base stations to the target area. Specifically, the control center dispatches U UAVs carrying small cell base stations to the target area.

Step 205: Randomly select U deployment points from all feasible deployment points. Specifically, randomly select U deployment points from all possible deployment points to deploy the U UAVs, where it is assumed that only one UAV can be deployed at each feasible deployment point at the same time.

Step 206: A UAV hovers at a current deployment point and schedule user requests. Specifically, the UAV hovers at the current deployment point, and uses a designed request scheduling algorithm (OL) to schedule user requests.

Request Scheduling Algorithm (OL):

After the UAVs are deployed, the requests are allocated to the deployed UAVs. The basic idea is to use an RR policy to schedule requests so that all requests can share the resources of UAVs fairly. To this end, multiple virtual UAVs are created for each UAV (that is, a physical UAV is treated as multiple virtual UAVs logically), where each virtual UAV has the same location as the physical UAV, and each virtual UAV has enough resources to process a single request. Specifically, the computing resources of each virtual UAV are:

$$C'(D_{max}) = \eta D_{max}(\delta/(\tau - D_{unit}/R_{min})) \quad (1)$$

where $D_{max}$ is a maximum data volume of a request to be processed, $D_{unit}$ represents a unit amount of data, $R_{unit}$ represents a lowest data transmission rate between a UAV and a user, and τ represents duration of a time slot. If η computing resources are allocated to process per-unit data, most of the requests can be processed within a time δ.

Next, a problem of minimizing a flow time is simplified to a problem of allocating a data portion of each request to a different time slot. Then, in each time slot, the RR scheduling policy is executed on all virtual UAVs to schedule the allocated data portions of the requests. To this end, a central queue is created in a powerful edge server. Each virtual UAV has a local queue over an RR scheduling algorithm, where the algorithm can schedule the requests allocated to it. To enhance the UAV's ability to respond to user requests, an immediate allocation method is adopted. That is, when a request arrives, it is allocated to a virtual UAV that has the minimum influence on a flow time of all tasks being executed in the system.

Specifically, the influence of a request $r_j$ in a current time slot on a total flow time is defined as follows:

$$\omega_j = (\rho_{j,s} \cdot k \cdot (s-a_j)^{k-1})/n_s + k \cdot (s-a_j)^{k-1} - \epsilon \quad (2)$$

$\rho_{j,s}$ is a discount factor of the influence of scheduling the request $r_j$ on valid requests in the current time slot (including requests that arrive in the current time slot and requests that arrive before the current time slot and have been processed), k represents an L_k norm, generally set to 2, s represents the current time slot, $a_j$ represents a time slot in which the request $r_j$ arrives, $n_s$ represents the number of requests that arrive in the time slot s, and ε is a constant.

A process of scheduling user requests by the request scheduling algorithm is as follows (that is, the detailed process of scheduling user requests in Step 6):

(1) Create multiple virtual UAVs according to the formula (1).
(2) In each time slot: allocate each arriving request to the central queue of the system, and mark the arrival time of all newly arrived requests as the current time slot.
(3) In each time slot: sort all requests to be processed in the system and requests newly arrived in the system in ascending order by the influence defined in the equation (2).
(4) In each time slot: allocate the sorted requests to the virtual UAVs with the minimum current load and reachable by requests, and use the RR policy to schedule the requests on each virtual UAV. One request can only be allocated to one virtual UAV for processing in a same time slot.
(5) In each time slot: all requests allocated to each virtual UAV share the same quantity of UAV resources.

Step 207: Determine whether network pressure in the target area is relieved. Specifically, after the specified time period t has elapsed, update an average flow time $F_q$ of all requests of the feasible deployment point q (q=1, 2, . . . , Q), and determine whether network pressure of the target area is relieved. If yes, go to Step 208.

Step 208: Control all UAVs to return to the control center; if no, go to Step 209.

Step 209: Check battery levels of the UAVs.

If the battery level of a UAV is lower than a threshold, go to Step 210.

Step 210: Control the UAV to return to a charging point. After the charging is completed, control the UAV to return to the target area to continue providing services.

If a battery level of the UAV exceeds a threshold, go to Step 210.

Step 211: Determine deployment points in a next period t based on a neural network model. Specifically, input historical request data of the feasible deployment points to a trained MT-LSTM neural network model, which then outputs a total to-be-processed data volume of each feasible deployment point during a specified time period t. Then determine, based on prediction results of the neural network model (for the prediction process, see the description in "Machine learning-based online optimization framework"), deployment locations of the UAVs that are fully charged and ready for service and the UAVs whose battery level is higher than the threshold, for a next time period t (or in the following duration t).

Machine Learning-Based Online Optimization Framework:

A machine learning-based online optimization framework is proposed to resolve flow time minimization in a UAV-assisted MEC network. Flow time minimization in the UAV-assisted MEC network refers to scheduling a given number of UAVs to a target area to serve user requests that arrive within a given time range. Within the given time range, by caching services from the remote cloud to dispatched UAVs, and offloading part or whole tasks of user requests to the UAVs, a total flow time of all processed requests is minimized under the limited computing power and energy of the UAVs.

Due to the limited coverage of UAVs (5G small cell base stations), for a given number of UAVs, to better relieve the network pressure of the target area, deployment of the UAVs needs to be optimized. A simple way is to dispatch a limited number of UAVs to locations with more user requests in the target area. However, the system does not know in advance the distribution of future requests and the volume of data to be processed. However, it is found that user requests are affected by recent events or some events that have occurred in a larger time range. For example, in an airport surveillance system, the volume of video data uploaded from cameras may be related to historical flight information of another flight scheduled to a same destination in one or more hours ago.

The MT-LSTM network is a variant of a recurrent neural network, which allows a long short-term memory (LSTM) network to learn time series with different time scales. The MT-LSTM can learn when to forget historical information in storage units and when to update the storage units with new information. To perform learning on different time scales, the MT-LSTM divides the gates, storage units and hidden states into g groups, where each group is activated on a different time scale. However, the MT-LSTM is designed for natural language processing applications, and directly applying the MT-LSTM may not capture dynamic changes of user requests in a UAV-assisted MEC network system.

Therefore, the number g of groups required for each MT-LSTM is adaptively determined based on an application scenario, that is, the UAV-assisted MEC network system. To put it simply, a longer flow time requires a greater number of groups $g_q$, but this information is unknown before the requests have been processed. Therefore, an average flow time $F_q$ of requests that have been completed at each feasible deployment point (that is, the block corresponding to the feasible deployment point) is used instead. Then, a maximum number of groups in the MT-LSTM required for predicting a total data volume of the feasible deployment point q is:

$$g_q = \max\{\lfloor \log_2 F_q \rfloor, 2\} \quad (3)$$

Specifically, as mentioned above, the target area is divided into blocks of equal size, and the time is divided into extremely small time slots of equal duration. In addition, it is assumed that at most only one UAV can hover on the center of each block in each time slot. In addition, 1, 2, ..., Q is used to number all feasible deployment points. If the UAV is frequently rescheduled, a lot of energy is consumed in the process of flying between the blocks. Therefore, UAVs will be redeployed at a specified time period t (including multiple time slots). A deployment decision is made based on the prediction result of the MT-LSTM model. To be specific, the MT-LSTM model predicts data volumes $\hat{D}_q$ to be processed at the feasible deployment points in a next time period t based on historical request data volumes of all feasible deployment points (blocks) in the area, sorts them in descending order, and then selects the first U feasible deployment points as deployment points of U UAVs in the next time period. Because a longer communication distance indicates larger communication overheads, it is believed that deploying UAVs to feasible deployment points with a larger to-be-processed data volume $\hat{D}_q$ is more likely to reduce communication overheads, so as to better serve users in the target area and relieve the network pressure of the target area.

On such basis, the machine learning-based online optimization framework is as follows:

(1) Use $F_q$ to represent an average flow time of requests that have been completed at the feasible deployment point q (q=1, 2, ..., Q).

(2) During each specified time period t, use the MT-LSTM model to predict a total to-be-processed data volume $\hat{D}_q$ (q=1, 2, ..., Q) at each feasible deployment point within a next specified time period t. To be specific, input historical request data of each feasible deployment point to the trained MT-LSTM model, which then outputs a total to-be-processed data volume of each feasible deployment point within the next specified time period t.

(3) During each specified time period t: sort all feasible deployment points in descending order by the predicted data volumes.

(4) During each specified time period t: assign UAVs to the high-ranking feasible deployment points.

(5) During each specified time period t: invoke a request scheduling algorithm (OL) to schedule requests.

(6) During each specified time period t: based on results delivered by the request scheduling algorithm (OL), update an average flow time $F_q$ of the requests that have been completed at each feasible deployment point.

Step 212: Dispatch the UAVs to the deployment points. Specifically, dispatch the UAVs to the deployment points determined in Step 211. Return to Step 206.

Each embodiment of the present specification is described in a progressive manner, each embodiment focuses on the difference from other embodiments, and the same and similar parts between the embodiments may refer to each other.

In this specification, several embodiments are used for illustration of the principles and implementations of the present disclosure. The description of the foregoing embodiments is used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A method for request scheduling in an unmanned aerial vehicle (UAV)-assisted mobile edge computing (MEC) network, steps comprising:

when receiving a UAV assistance request from a target area, dividing the target area into multiple blocks of equal size, and determining multiple feasible UAV deployment points based on obstruction information in the target area, wherein one feasible UAV deployment point corresponds to one block;

randomly selecting U feasible UAV deployment points from the multiple feasible UAV deployment points as UAV deployment points;

dispatching U UAVs carrying small cell base stations to the U UAV deployment points respectively, wherein one UAV hovers at one UAV deployment point;

dividing each UAV into multiple virtual UAVs, wherein each virtual UAV has the same position as the corresponding physical UAV, and total computing resources of all the virtual UAVs are equal to computing resources of the corresponding physical UAV;

allocating user requests in a central queue of a DAV-assisted MEC to the virtual UAVs, wherein the central queue of the system is jointly maintained by an edge serverand all the UAVs carrying small cell base stations;

using a round-robin (RR) policy to schedule the user requests allocated to each virtual UAV;

after a specified time period t, determining whether network pressure of the target area meets a mitigation condition;

if the mitigation condition is met, controlling all the UAVs carrying small cell base stations to fly away from the target area;

if the mitigation condition is not met, obtaining historical user request data of each feasible UAV deployment point;

inputting the historical user request data of each feasible UAV deployment point into a trained multi-timescale long short-term memory (MT-LSTM) neural network model to predict a to-be-processed data volume of each feasible UAV deployment point in a next specified time period t; and re-determining UAV deployment points based on the predicted to-be-processed data volume of each feasible UAV deployment point in the next specified time period t, redeploying UAVs carrying small cell base stations based on the UAV deployment points, and returning to the step of dividing each UAV into multiple virtual UAVs, wherein each virtual UAV has the same position as the corresponding physical UAV, and total computing resources of all the virtual UAVs are equal to computing resources of the corresponding physical UAV.

2. The method for request scheduling in a UAV-assisted MEC network in claim 1, wherein before the dividing, when receiving a UAV assistance request from a target area, the target area into multiple blocks of equal size, and determining multiple feasible UAV deployment points based on obstruction information in the target area, the method further comprises:
   collecting network load and network delay information of the target area;
   determining whether the network load is greater than a first preset load value or whether the network delay is greater than a first preset delay value; and
   if the network load is greater than the first preset load value or the network delay is greater than the first preset delay value, sending the UAV assistance request.

3. The method for request scheduling in a UAV-assisted MEC network in claim 1, wherein when receiving a UAV assistance request from a target area, the method further comprises:
   obtaining obstruction information in the target area through a reconnaissance UAV.

4. The method for request scheduling in a UAV-assisted MEC network in claim 1, wherein the mitigation condition is that the network load is less than a second preset load value and the network delay is less than a second preset delay value.

5. The method for request scheduling in a UAV-assisted MEC network in claim 1, wherein the re-determining UAV deployment points based on the predicted to-be-processed data volume of each feasible UAV deployment point in the next specified time period t, and redeploying UAVs carrying small cell base stations based on the UAV deployment points further comprises:
   sorting the predicted to-be-processed data volumes of the feasible UAV deployment points in the next specified time period t in descending order, and selecting the first U feasible deployment points as new UAV deployment points; and
   deploying the U UAVs carrying small cell base stations to the UAV deployment points, wherein one UAV hovers at one UAV deployment point.

6. The method for request scheduling in a UAV-assisted MEC network in claim 1, wherein when obtaining historical user request data of each feasible UAV deployment point, the method further comprises:
   updating an average flow time of user requests at each feasible UAV deployment point based on historical user requests processed at each feasible UAV deployment point, wherein a flow time is a time difference between a time point at which processing of a user request is completed and a time point at which the request arrives at the central queue of the system; and
   based on the average flow time of the user requests at each feasible UAV deployment point, determining a maximum number of groups for prediction in the MT-LSTM neural network model corresponding to each feasible UAV deployment point; and classifying gates, storage units, and hidden states in the MT-LSTM neural network model into g groups, wherein each group is activated on a different time scale, and the maximum number of groups is a maximum number of groups activated in the MT-LSTM neural network model.

7. The method for request scheduling in a UAV-assisted MEC network in claim 6, wherein the maximum number of groups is denoted as $$g_q = \max\{\lfloor \log_2 F_q \rfloor, 2\}; \text{ and}$$

wherein $g_q$ represents a maximum number of groups of each feasible UAV deployment point q and $F_q$ represents an average flow time of each feasible UAV deployment point q.

8. The method for request scheduling in a UAV-assisted MEC network in claim 1, wherein the using a RR policy to schedule the user requests allocated to each virtual UAV specifically comprises:
   dividing the specified time period t into multiple time slots; and
   in each time slot, using the RR policy to schedule the user requests allocated to each virtual UAV.

9. The method for request scheduling in a UAV-assisted MEC network in claim 1, wherein if the mitigation condition is not met, the method further comprises:
   determining whether a battery level of each UAV is less than a preset battery level threshold; and
   if yes, controlling a UAV with a battery level less than the preset battery level threshold to return to a charging point for charging, and after the charging is completed, controlling the UAV to return to the target area.

* * * * *